US011499510B2

(12) United States Patent
Ichikawa et al.

(10) Patent No.: US 11,499,510 B2
(45) Date of Patent: Nov. 15, 2022

(54) ENGINE SYSTEM AND METHOD OF CONTROLLING THE ENGINE SYSTEM

(71) Applicant: TOYOTA JIDOSHA KABUSHIKI KAISHA, Aichi-ken (JP)

(72) Inventors: Koji Ichikawa, Aichi-ken (JP); Hisayuki Itoh, Toyota (JP); Hirokazu Kato, Nisshin (JP); Masaaki Yamaguchi, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/929,110

(22) Filed: Jul. 15, 2020

(65) Prior Publication Data

US 2021/0115881 A1 Apr. 22, 2021

(30) Foreign Application Priority Data

Oct. 17, 2019 (JP) ............................ JP2019-190465

(51) Int. Cl.
*F02D 41/22* (2006.01)
*F02M 26/49* (2016.01)
*F02D 41/00* (2006.01)

(52) U.S. Cl.
CPC ........... *F02M 26/49* (2016.02); *F02D 41/222* (2013.01); *F02D 41/0077* (2013.01); *F02D 2041/0075* (2013.01); *F02D 2200/0406* (2013.01)

(58) Field of Classification Search
CPC .. F02D 41/0077; F02D 41/123; F02D 41/222; F02D 2041/0075; F02D 2200/0406; F02M 26/49
See application file for complete search history.

(56) References Cited

U.S. PATENT DOCUMENTS 5,698,780 A * 12/1997 Mizutani ............... F02D 41/222 73/114.33
7,370,644 B2 * 5/2008 Wang ..................... F02M 26/47 123/568.12
9,222,441 B2 * 12/2015 Yoshioka .............. F02M 26/06
(Continued)

FOREIGN PATENT DOCUMENTS

| | | | |
|---|---|---|---|
| CN | 109630324 | A | 4/2019 |
| JP | S643257 | A | 1/1989 |

(Continued)

*Primary Examiner* — Gonzalo Laguarda
(74) *Attorney, Agent, or Firm* — Hauptman Ham, LLP

(57) ABSTRACT

In an engine system including an engine, and an exhaust gas recirculation device including a communicating pipe that communicates an exhaust pipe of the engine with an intake pipe, and a valve provided in the communicating pipe, and an electronic control unit, and its control method, the electronic control unit estimates the pressure in the intake pipe as an estimated intake pressure, and performs a jamming diagnosis to determine whether foreign matter is stuck in the valve, by comparing an intake pressure difference between a detected intake pressure and the estimated intake pressure with a threshold value, when a diagnosis condition including an opening change condition that the target opening becomes equal to or larger than a first predetermined opening and then becomes equal to or smaller than a second predetermined opening that is smaller than the first predetermined opening is satisfied.

7 Claims, 5 Drawing Sheets

(56) References Cited

U.S. PATENT DOCUMENTS

| | | | | |
|---|---|---|---|---|
| 10,975,779 | B2 * | 4/2021 | Yoshioka | F02M 26/49 |
| 10,982,604 | B2 * | 4/2021 | Yoshioka | F02D 41/221 |
| 2018/0283326 | A1 * | 10/2018 | Miura | F02M 26/52 |
| 2019/0107064 | A1 | 4/2019 | Yoshioka | |
| 2019/0293007 | A1 * | 9/2019 | Yoshioka | F02D 41/0097 |
| 2019/0338717 | A1 | 11/2019 | Nagao et al. | |

FOREIGN PATENT DOCUMENTS

| | | | |
|---|---|---|---|
| JP | H842403 | A | 2/1996 |
| JP | 2011252399 | A | 12/2011 |
| JP | 201534525 | A | 2/2015 |
| JP | 2018168816 | A | 11/2018 |
| JP | 2019157771 | A | 9/2019 |

* cited by examiner

ENGINE SYSTEM AND METHOD OF CONTROLLING THE ENGINE SYSTEM

CROSS-REFERENCE TO RELATED APPLICATION

This application claims priority to Japanese Patent Application No. 2019-190465 filed on Oct. 17, 2019, which is incorporated herein by reference in its entirety.

BACKGROUND

1. Technical Field

The disclosure relates to an engine system and a method of controlling the engine system.

2. Description of Related Art

One example of the engine system as proposed in Japanese Unexamined Patent Application Publication No. 2011-252399 (JP 2011-252399) includes an internal combustion engine, and an exhaust gas recirculation (EGR) device including an EGR passage that communicates an exhaust manifold of an exhaust system of the internal combustion engine with a surge tank of an intake system, and an EGR valve provided in the EGR passage. In the engine system, the pressure in an intake pipe when opening and closing of the EGR valve is controlled is actually measured, and the pressure in the intake pipe which is expected to be achieved under the opening/closing control is estimated. Then, a failure of the EGR device is detected, based on comparison between the actual measurement value and estimated value of the pressure in the intake pipe. When there is a failure in the EGR device, the type of the failure, which is selected from a plurality of failure types, is determined. The failure types include sticking of the EGR valve, jamming of foreign matter in the EGR valve, and reduction in the diameter of the EGR passage.

SUMMARY

When a large-flow EGR device including a large-diameter EGR passage is used as the EGR device of the engine system, the size of foreign matter that is allowed to get caught in the EGR valve is relatively small, as compared with the case where a small-flow EGR device including a small-diameter EGR passage is used. When the EGR valve cannot be closed due to jamming of foreign matter in the valve, against a request for closing the EGR valve, a problem, such as misfiring or stall, is more likely to occur in the engine in the case of the large-flow EGR device including the large-diameter EGR passage, since the amount (EGR amount) of exhaust gas flowing through the EGR passage is larger, as compared with the case of the small-flow EGR device including the small-diameter EGR passage. Thus, when the large-flow EGR device is used, it is preferable to reduce a threshold value used when comparing the actual measurement value and estimated value of the pressure in the intake pipe. In this case, however, jamming of foreign matter in the EGR valve is more likely to be erroneously detected.

The disclosure provides an engine system and a method of controlling the engine system, which make it less likely or unlikely to erroneously detect jamming of foreign matter in an EGR valve.

The engine system and the method of controlling the engine system as described below are employed according to the disclosure, so as to curb erroneous detection of jamming of foreign matter in the EGR valve.

A first aspect of the disclosure is concerned with an engine system including an engine including a pressure sensor configured to detect a pressure in an intake pipe as a detected intake pressure, an exhaust gas recirculation device including a communicating pipe that communicates an exhaust pipe of the engine with the intake pipe, and a valve provided in the communicating pipe, and an electronic control unit configured to control the engine, and control the valve based on a target opening of the valve. The electronic control unit is configured to estimate the pressure in the intake pipe as an estimated intake pressure, and is configured to perform a jamming diagnosis to determine whether foreign matter is stuck in the valve, by comparing an intake pressure difference between the detected intake pressure and the estimated intake pressure with a threshold value, when a diagnosis condition including an opening change condition is satisfied. The opening change condition is that the target opening becomes equal to or larger than a first predetermined opening and then becomes equal to or smaller than a second predetermined opening that is smaller than the first predetermined opening.

In the engine system according to the first aspect of the disclosure, when the diagnosis condition including the opening change condition that the target opening of the valve of the exhaust gas recirculation device becomes equal to or larger than the first predetermined opening and then becomes equal to or smaller than the second predetermined opening that is smaller than the first predetermined opening is satisfied, the jamming diagnosis is performed so as to determine whether foreign matter is stuck in the valve, by comparing the intake pressure difference between the detected intake pressure and the estimated intake pressure, with the threshold value. Accordingly, when the diagnosis condition is satisfied, the jamming diagnosis is performed, so that jamming of foreign matter in the valve, if any, can be detected. When the diagnosis condition is not satisfied, the jamming diagnosis is not performed, so that erroneous detection of jamming of foreign matter in the valve can be curbed.

In the engine system according to the first aspect, the electronic control unit may be configured to set the first predetermined opening, as an opening that is slightly larger than an opening corresponding to a minimum diameter of foreign matter that is desired to be detected when the foreign matter gets caught in the valve.

In the engine system configured as described above, the first predetermined opening is set as the opening that is slightly larger than the opening corresponding to the minimum diameter of foreign matter that is desired to be detected when the foreign matter gets caught in the valve. Thus, when the foreign matter gets caught in the valve when the diagnosis condition is satisfied, jamming is surely or reliably detected. When the diagnosis condition is not satisfied, the jamming diagnosis is not performed; thus, erroneous detection of jamming of foreign matter in the valve can be curbed.

In the engine system of the first aspect, the electronic control unit may be configured to perform the jamming diagnosis over a predetermined period of time, when the diagnosis condition is satisfied.

In the engine system of the first aspect, the diagnosis condition may include an intake pressure condition that the estimated intake pressure or the detected intake pressure is lower than a predetermined pressure, in addition to the opening change condition.

When the estimated intake pressure or the detected intake pressure is large (or small as a negative pressure), the amount of exhaust gas flowing through the communication pipe is presumed to be less likely to be large, and the intake pressure difference is presumed to be less likely to be large, even when foreign matter gets caught in the valve, and the valve cannot be closed, against a request for closing the valve. Namely, a difference between the intake pressure difference obtained when foreign matter is not stuck in the valve and that obtained when foreign matter is stuck in the valve is presumed to be small. Therefore, when the estimated intake pressure or detected intake pressure is equal to or higher than the predetermined pressure, the jamming diagnosis is not performed as the diagnosis condition is not satisfied; as a result, erroneous detection of jamming of foreign matter in the valve can be further curbed.

A second aspect of the disclosure is concerned with a method of controlling an engine system including an engine including a pressure sensor configured to detect a pressure in an intake pipe as a detected intake pressure, and an exhaust gas recirculation device including a communicating pipe that communicates an exhaust pipe of the engine with the intake pipe, and a valve provided in the communicating pipe. The control method includes controlling the engine, and controlling the valve based on a target opening of the valve, estimating the pressure in the intake pipe as an estimated intake pressure, and performing a jamming diagnosis to determine whether foreign matter is stuck in the valve, by comparing an intake pressure difference between the detected intake pressure and the estimated intake pressure with a threshold value, when a diagnosis condition including an opening change condition is satisfied. The opening change condition is that the target opening becomes equal to or larger than a first predetermined opening and then becomes equal to or smaller than a second predetermined opening that is smaller than the first predetermined opening.

In the method of controlling the engine system according to the second aspect of the disclosure, when the diagnosis condition including the opening change condition that the target opening of the valve of the exhaust gas recirculation device becomes equal to or larger than the first predetermined opening and then becomes equal to or smaller than the second predetermined opening that is smaller than the first predetermined opening is satisfied, the jamming diagnosis is performed so as to determine whether foreign matter is stuck in the valve, by comparing the intake pressure difference between the detected intake pressure and the estimated intake pressure, with the threshold value. Accordingly, when the diagnosis condition is satisfied, the jamming diagnosis is performed, so that jamming of foreign matter in the valve, if any, can be detected. When the diagnosis condition is not satisfied, the jamming diagnosis is not performed, so that erroneous detection of jamming of foreign matter in the valve can be curbed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
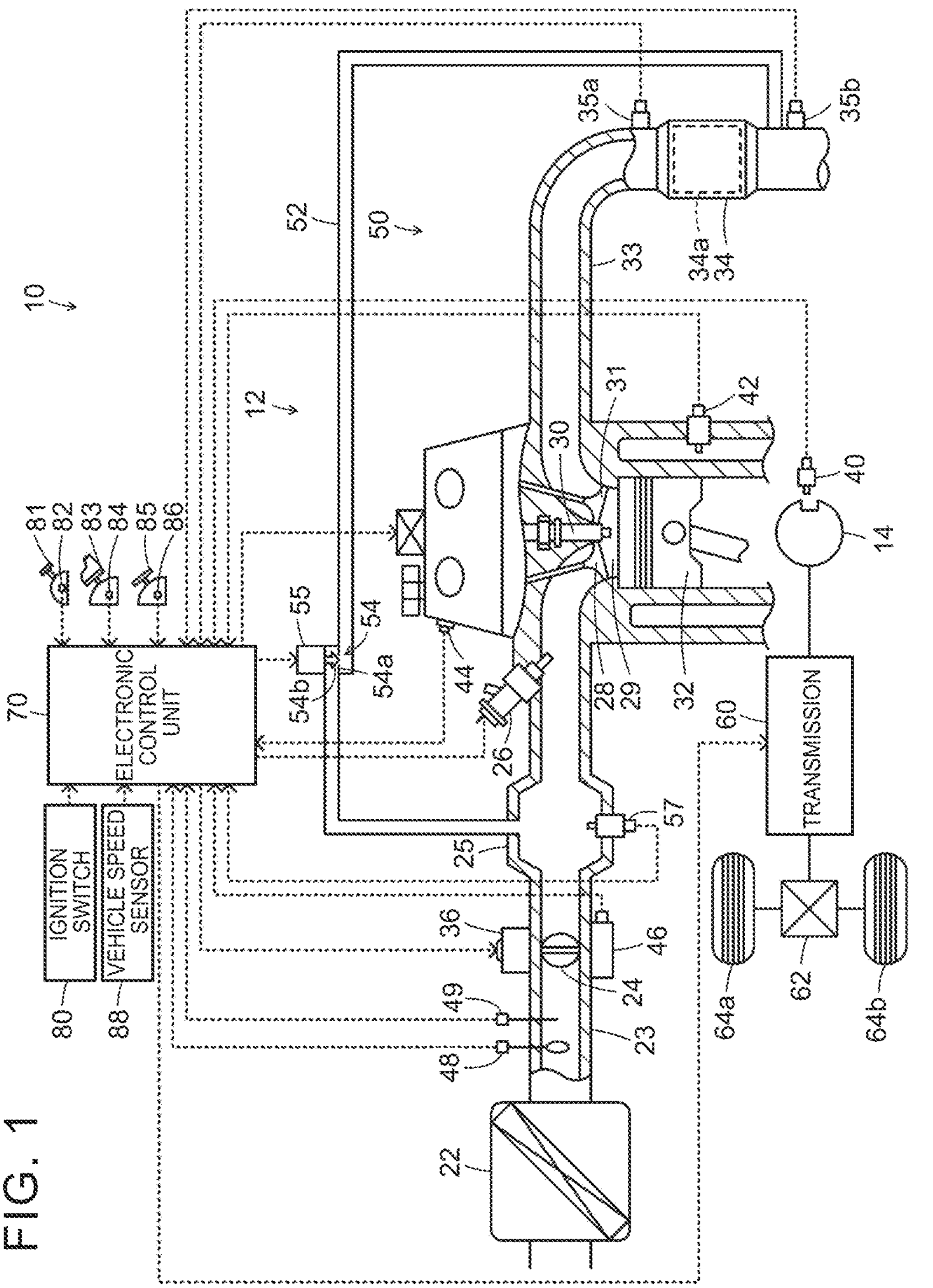
FIG. 1 is a view schematically showing the configuration of an automobile on which an engine system as one embodiment of the disclosure is installed.

Next, one embodiment of the disclosure will be described. FIG. 1 schematically shows the configuration of an automobile 10 on which an engine system as one embodiment of the disclosure is installed. As shown in FIG. 1, the automobile 10 of the embodiment includes an engine 12, exhaust gas recirculation device (which will be called "EGR device") 50, transmission 60, and an electronic control unit 70 that controls the whole vehicle. The transmission 60 is connected to a crankshaft 14 of the engine 12, and is also connected to drive wheels 64*a*, 64*b* via a differential gear set 62. The "engine system" of this embodiment includes the engine 12, EGR device 50, and electronic control unit 70.

The engine 12 is constructed as an internal combustion engine that generates power, using fuel, such as gasoline or light oil. In the engine 12, air, which is cleaned by an air cleaner 22, is drawn into an intake pipe 23, and is caused to flow through a throttle valve 24 and a surge tank 25 in this order. Meanwhile, the fuel is injected from a fuel injector 26 located downstream of the surge tank 25 of the intake pipe 23, so that the air and the fuel are mixed together. Then, the air-fuel mixture is drawn into a combustion chamber 29 via an intake valve 28, and is exploded and burned with an electric spark produced by an ignition plug 30. Then, reciprocating motion of a piston 32 that is pushed down by energy generated through explosive combustion is converted into rotary motion of the crankshaft 14. Exhaust gas discharged from the combustion chamber 29 into an exhaust pipe 33 via an exhaust valve 31 is discharged to the outside air via a catalytic converter 34, and is also supplied (recirculated) to the intake pipe 23 via the EGR device 50. The catalytic converter 34 includes a catalyst (three-way catalyst) 34*a* that reduces or removes harmful components, such as carbon monoxide (CO), hydrocarbon (HC), and nitrogen oxides (NOx), in the exhaust gas.

The EGR device 50 includes an EGR pipe 52 and an EGR valve 54. The EGR pipe 52 communicates a portion of the exhaust pipe 33 located downstream of the catalytic converter 34, with the surge tank 25 of the intake pipe 23. The EGR valve 54 is provided in the EGR pipe 52, and includes a valve seat 54*a* and a valve body 54*b*. The valve seat 54*a* includes a hole having a smaller diameter than the inside diameter of the EGR pipe 52. The valve body 54*b* is driven by a stepping motor 55, and moves in an axial direction (vertical direction in FIG. 1) of the valve body 54*b*. The EGR valve 54 is closed when the valve body 54*b* moves toward the valve seat 54*a* (downward in FIG. 1), and a distal end portion (lower end portion in FIG. 1) of the valve body 54*b* blocks the hole of the valve seat 54*a*. Also, the EGR valve 54 is opened when the valve body 54*b* moves away from the valve seat 54*a* (upward in FIG. 1), and the distal end portion of the valve body 54*b* is spaced apart from the valve seat 54*a*, to open the hole of the valve seat 54*a*.

The EGR device 50 adjusts the amount of exhaust gas recirculated from the exhaust pipe 33 by adjusting the opening of the EGR valve 54 by means of the stepping motor 55, and recirculates the exhaust gas into the intake pipe 23. Thus, the engine 12 is able to draw the mixture of the air, exhaust gas and fuel, into the combustion chamber 29. In the following description, the recirculation of exhaust gas will be called "EGR", and the amount of exhaust gas recirculated will be called "EGR amount".

The electronic control unit 70 is configured as a microprocessor including a CPU as a main component, and includes a ROM that stores processing programs, RAM that temporarily stores data, and input and output ports, in addition to the CPU. The electronic control unit 70 receives signals from various sensors needed for controlling operation of the engine 12, via the input port.

For example, the signals received by the electronic control unit 70 include a crank angle θcr, coolant temperature Tw, cam angles θci, θco, throttle opening TH, intake air amount Qa, intake air temperature Ta, detected intake pressure Pind, air-fuel ratio AF, oxygen signal O2, ignition signal IG, shift position SP, accelerator pedal position Acc, brake pedal position BP, vehicle speed V, and so forth. The electronic control unit 70 receives the crank angle θcr from a crank position sensor 40 that detects the rotational position of the crankshaft 14 of the engine 12. The electronic control unit 70 receives the coolant temperature Tw from a water temperature sensor 42 that detects the temperature of the coolant of the engine 12. The electronic control unit 70 receives the cam angles θci, θco from a cam position sensor 44 that detects the rotational position of an intake camshaft that opens and closes the intake valve 28 and the rotational position of an exhaust camshaft that opens and closes the exhaust valve 31. The electronic control unit 70 receives the throttle opening TH from a throttle position sensor 46 that detects the position of the throttle valve 24. The electronic control unit 70 receives the intake air amount Qa from an air flow meter 48 mounted on the intake pipe 23. The electronic control unit 70 receives the intake air temperature Ta from a temperature sensor 49 mounted on the intake pipe 23. The detected intake pressure Pind is a detection value of the pressure in the surge tank 25, which is received from a pressure sensor 57 mounted on the surge tank 25.

The electronic control unit 70 receives the air-fuel ratio AF from an air-fuel ratio sensor 35*a* mounted on the exhaust pipe 33. The electronic control unit 70 receives the oxygen signal O2 from an oxygen sensor 35*b* mounted on the exhaust pipe 33. The electronic control unit 70 receives the ignition signal IG from an ignition switch 80. The electronic control unit 70 receives the shift position SP from a shift position sensor 82 that detects a position to which a shift lever 81 is operated. The electronic control unit 70 receives the accelerator pedal position Acc from an accelerator pedal position sensor 84 that detects the amount of depression of an accelerator pedal 83. The electronic control unit 70 receives the brake pedal position BP from a brake pedal position sensor 86 that detects the amount of depression of a brake pedal 85. The electronic control unit 70 receives the vehicle speed V from a vehicle speed sensor 88.

Various control signals for controlling operation of the engine 12 are generated from the electronic control unit 70 via the output port. The signals generated from the electronic control unit 70 include, for example, a control signal to a throttle motor 36 that adjusts the position of the throttle valve 24, a control signal to the fuel injector 26, a control signal to the ignition plug 30, and a control signal to the stepping motor 55 that adjusts the opening of the EGR valve 54. The signals also include a control signal to the transmission 60.

The electronic control unit 70 computes the rotational speed Ne of the engine 12, based on the crank angle θcr received from the crank position sensor 40. Also, the electronic control unit 70 obtains an estimated intake pressure Pine as an estimated value of the pressure in the surge tank 25, based on the intake air amount Qa received from the air flow meter 48. Here, the estimated intake pressure Pine can be obtained by applying the intake air amount Qa to a relationship determined in advance by experiment or analysis, between the intake air amount Qa and the estimated intake pressure Pine.

In the engine system installed on the automobile 10 of the embodiment, the electronic control unit 70 sets a target gear position Gs* of the transmission 60, based on the accelerator pedal position Acc and the vehicle speed V, and controls the transmission 60 so that the gear position Gs of the transmission 60 becomes equal to the target gear position Gs*. Also, the electronic control unit 70 sets a target torque Te* of the engine 12, based on the accelerator pedal position Acc, vehicle speed V, and gear position Gs of the transmission 60, and performs operation control (e.g., intake air amount control, fuel injection control, ignition control, etc.) of the engine 12, and control of the EGR device 50, so that the engine 12 is operated based on the target torque Te*.

The EGR device 50 is controlled as follows: when EGR conditions are satisfied, a target EGR amount Vegr* is set based on an operating point (the target torque Te* and the rotational speed Ne) of the engine 12, for example. Then, a target opening Ov* of the EGR valve 54 is set based on the target EGR amount Vegr*. The stepping motor 55 is controlled based on the target opening Ov* of the EGR valve 54. On the other hand, when any of the EGR conditions is not satisfied, the target opening Ov* of the EGR valve 54 is set to value 0, and the stepping motor 55 is controlled based on the target opening Ov* of the EGR valve 54. The EGR conditions include a condition that warm-up of the engine 12 is completed, a condition that the target torque Te* of the engine 12 is within a predetermined range, and so forth.

Figure 2:
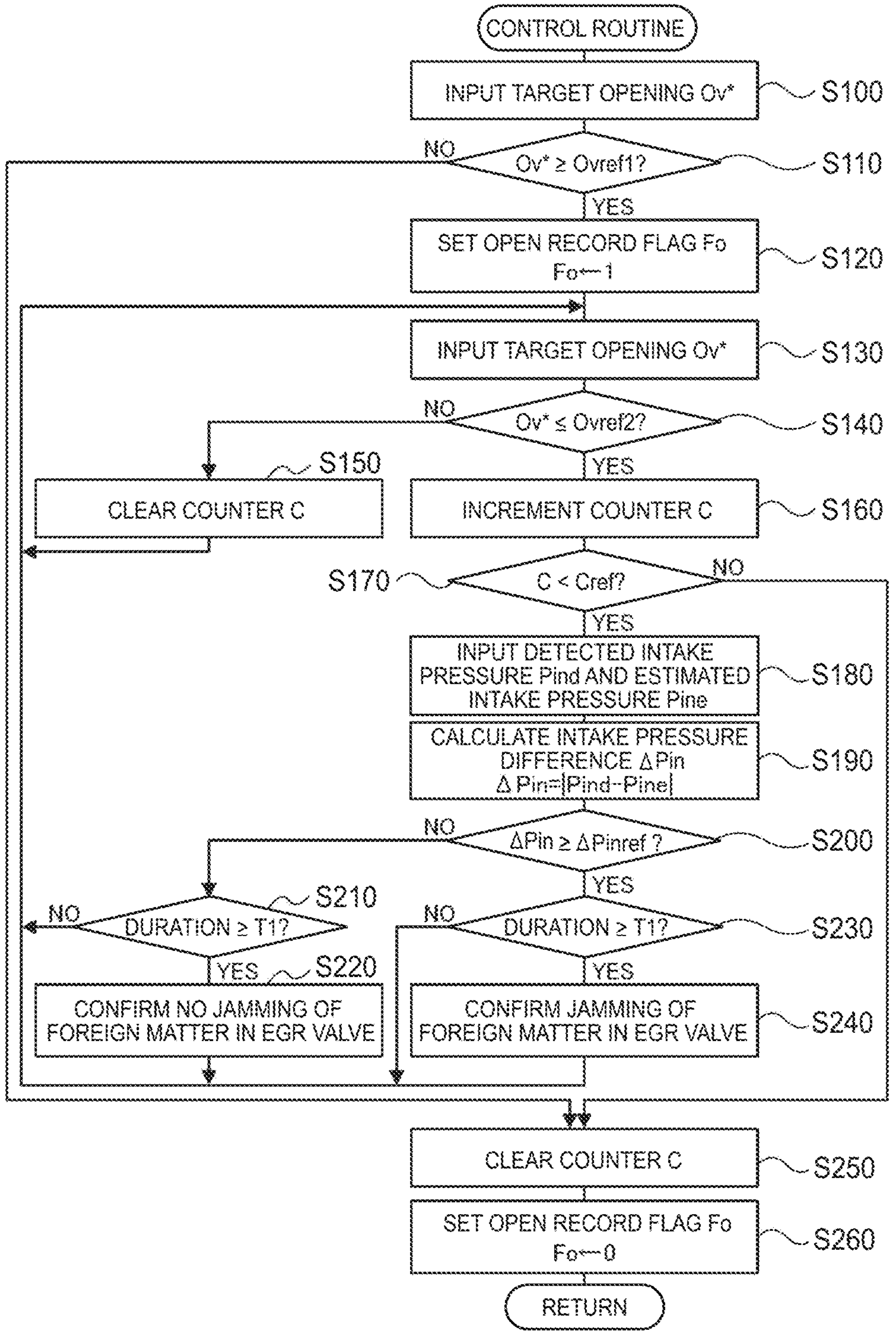
FIG. 2 is a flowchart illustrating one example of a control routine executed by an electronic control unit shown in FIG. 1.

Next, operation of the engine system installed on the automobile 10 of the embodiment constructed as described above will be described. In particular, operation of the engine system when a jamming diagnosis as to whether foreign matter got caught between the valve seat Ma and the valve body 54*b* of the EGR valve 54 is performed will be described. FIG. 2 is a flowchart illustrating one example of a control routine executed by the electronic control unit 70. This routine is repeatedly executed when it is not confirmed that foreign matter is stuck in the EGR valve 54.

Once the control routine of FIG. 2 is executed, the electronic control unit 70 initially inputs the target opening Ov* of the EGR valve 54 (step S100), and compares the input target opening Ov* of the EGR valve 54 with a first threshold value Ovref1 (step S110). The first threshold value Ovref1 is set as an opening that is slightly larger than an opening corresponding to the minimum diameter of foreign matter that is desired to be detected when the foreign matter gets caught in the EGR valve 54. For example, the first threshold value Ovref1 is set to about 15% to 30%.

When the target opening Ov* of the EGR valve 54 is smaller than the first threshold value Ovref1 in step S110, a counter C is cleared, namely, set to value 0 (step S250), and an open record flag Fo is set to value 0 (step S260). Then, the current cycle of the routine of FIG. 2 ends. The counter C means a value corresponding to a duration for which a diagnosis condition for a jamming diagnosis is satisfied. The open record flag Fo indicates the presence or absence of a record that the target opening Ov* of the EGR valve 54 has become equal to or larger than the first threshold value Ovref1.

When the target opening Ov* of the EGR valve 54 is equal to or larger than the first threshold value Ovref1 in step S110, the electronic control unit 70 sets value 1 to the open record flag Fo (step S120), and inputs the target opening Ov* of the EGR valve 54 (step S130). Then, the input target opening Ov* of the EGR valve 54 is compared with a second threshold value Ovref2 that is smaller than the first threshold value Ovref1 (step S140). As the second threshold value Ovref2, an opening within a range from 0% to a value slightly smaller than the first threshold value Ovref1 is used.

In this embodiment, as the diagnosis condition of the jamming diagnosis, an opening change condition that the target opening Ov* of the EGR valve 54 becomes equal to or larger than the first threshold value Ovref1, and then becomes equal to or smaller than the second threshold value Ovref2 is used, for the reason as follows. When it is confirmed in the last jamming diagnosis that foreign matter is not stuck in the EGR valve 54, or when it has not been confirmed whether foreign matter got caught in the EGR valve 54 (for example, when the diagnosis condition is not newly satisfied after foreign matter is removed through execution of foreign matter removal control that will be described later), there is presumed to be a sufficiently low possibility that foreign matter enters a clearance between the valve seat 54*a* and valve body 54*b* of the EGR valve 54, before the target opening Ov* of the EGR valve 54 reaches the first threshold value Ovref1, and there is presumed to be a sufficiently low possibility that foreign matter gets caught between the valve seat 54*a* and the valve body 54*b*. On the other hand, when the opening change condition is satisfied, there is presumed to be a possibility that foreign matter gets caught between the valve seat 54*a* and valve body 54*b* of the EGR valve 54 when the opening of the EGR valve 54 is reduced (for example, when the EGR valve 54 is closed). In this embodiment, steps S110, S140 are executed, in view of the presumption.

When the target opening Ov* of the EGR valve 54 is larger than the second threshold value Ovref2 in step S140, the electronic control unit 70 determines that the diagnosis condition is not satisfied, clears the counter C to value 0 (step S150), and returns to step S130.

When the target opening Ov* of the EGR valve 54 is equal to or smaller than the second threshold value Ovref2 in step S140, the electronic control unit 70 determines that the diagnosis condition is satisfied, increments the counter C by value 1 (step S160), and compares the counter C with a third threshold value Cref (step S170). The third threshold value Cref is set as a value corresponding to the diagnosis time of the jamming diagnosis, and a value corresponding to several hundreds of milliseconds to one second is used as the third threshold value Cref, for example.

When the counter C is smaller than the third threshold value Cref in step S170, the electronic control unit 70 inputs the detected intake pressure Pind from the pressure sensor 57 and the estimated intake pressure Pine estimated by the electronic control unit 70 (step S180). Then, the electronic control unit 70 calculates an intake pressure difference ΔPin (=|Pind−Pine|) as a difference between the detected intake pressure Pind and the estimated intake pressure Pine (step S190), and compares the calculated intake pressure difference ΔPin with a fourth threshold value ΔPinref (step S200). The fourth threshold value ΔPinref is used for determining whether foreign matter is stuck in the EGR valve 54, and is determined in advance by experiment or analysis.

When the intake pressure difference ΔPin is smaller than the fourth threshold value ΔPinref in step S200, its duration (which will be called "small-difference duration") for which ΔPin is smaller than ΔPinref is compared with a confirmation time T1 (step S210). The confirmation time T1 is a length of time required to confirm whether foreign matter is stuck in the EGR valve 54, and is set to a length of time slightly shorter than the diagnosis time (corresponding to the third threshold value Cref) of the jamming diagnosis. When the small-difference duration is shorter than the confirmation time T1, the electronic control unit 70 returns to step S130, without confirming that foreign matter is not stuck in the EGR valve 54. When the small-difference duration is equal to or longer than the confirmation time T1, the electronic control unit 70 confirms that foreign matter is not stuck in the EGR valve 54 (step S220), and returns to step S130.

When the intake pressure difference ΔPin is equal to or larger than the fourth threshold value ΔPinref in step S200, its duration (which will be called "large-difference duration") for which ΔPin is equal to or larger than ΔPinref is compared with the confirmation time T1 (step S230). When the large-difference duration is shorter than the confirmation time T1, the electronic control unit 70 returns to step S130, without confirming that foreign matter is stuck in the EGR valve 54. When the large-difference duration is equal to or longer than the confirmation time T1, the electronic control unit 70 confirms that foreign matter is stuck in the EGR valve 54 (step S240), and returns to step S130.

When the electronic control unit 70 confirms that foreign matter is stuck in the EGR valve 54, it may store the information in a non-volatile memory (not shown), or inform the driver of the information, by turning on an alarm lamp (not shown), or generating voice from a speaker (not shown). When the electronic control unit 70 confirms that foreign matter is stuck in the EGR valve 54, foreign matter removal control is preferably executed by opening and closing the EGR valve 54 a predetermined number of times or for a predetermined period of time in appropriate timing after the confirmation, so as to remove the foreign matter. With the foreign matter thus removed, the electronic control unit 70 withdraws the confirmation that foreign matter is stuck in the EGR valve 54, and resumes repeated execution of the routine of FIG. 2.

When the opening change condition is satisfied, the jamming diagnosis is performed, so that jamming of foreign matter in the EGR valve 54, if any, can be detected. On the other hand, when the opening change condition is not satisfied, the jamming diagnosis is not performed, so that the electronic control unit 70 is less likely or unlikely to erroneously detect (erroneously confirm) that foreign matter is stuck in the EGR valve 54.

The significance of not performing the jamming diagnosis when the opening change condition is not satisfied is greater in the case where a large-flow EGR device of which the EGR pipe 52 has a large diameter is used as the EGR device 50, as compared with the case where a small-flow EGR device of which the EGR pipe 52 has a small diameter is used. In the former case, the size of the foreign matter that does not cause a problem (can allow jamming) even if it gets caught in the EGR valve 54 is small, as compared with the latter case. This is because, when the EGR valve 54 cannot be closed due to foreign matter stuck in the EGR valve 54, against a request for closing the EGR valve 54, the unintended or undesired EGR amount is larger in the former case, as compared with that in the latter case, and a problem, such as misfiring or stall, is more likely to occur in the engine 12 in the former case. Thus, it is preferable to reduce the fourth threshold value ΔPinref when the large-flow EGR device is used; however, jamming of foreign matter in the EGR valve 54 is likely to be erroneously detected (erroneously confirmed). For this reason, the significance of not performing the jamming diagnosis when the opening change condition is not satisfied is greater when the large-flow EGR device is used.

When the counter C reaches a value equal to or larger than the third threshold value Cref in step S170, after repeated execution of steps S130, S140, S160-S220, or steps S130, S140, S160-S200, S230, S240, the jamming diagnosis is finished, the counter C is cleared to value 0 (step S250), the open record flag Fo is set to value 0 (step S260), and this routine ends.

Figure 3:
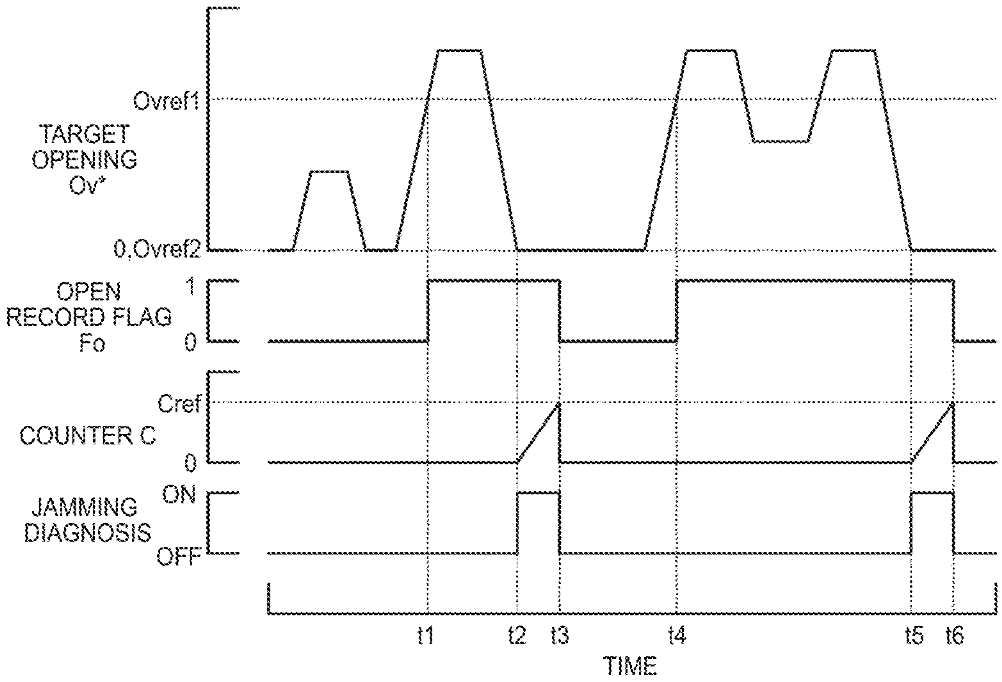
FIG. 3 is an explanatory view showing one example of changes in a target opening of an EGR valve shown in FIG. 1, open record flag, and a counter, and ON/OFF of jamming diagnosis.

FIG. 3 is an explanatory view showing one example of changes in the target opening Ov* of the EGR valve 54, open record flag Fo, and counter C, and the presence or absence (ON/OFF) of the jamming diagnosis. FIG. 3 shows the case where value 0 is used as the second threshold value Ovref2. As shown in FIG. 3, when the target opening Ov* of the EGR valve 54 reaches a value equal to or larger than the first threshold value Ovref1 (time t1, t4) while the open record flag Fo is value 0, the open record flag Fo is switched to value 1. Then, when the target opening Ov* of the EGR valve 54 becomes equal to or smaller than the second threshold value Ovref2 (time t2, t5), the counter C starts incrementing, and the jamming diagnosis starts. Then, when the counter C reaches a value equal to or larger than the third threshold value Cref (time t3, t6), the jamming diagnosis ends, the counter C is cleared to value 0, and the open record flag Fo is switched to value 0.

In the engine system installed on the automobile 10 of the embodiment as described above, when the opening change condition that the target opening Ov* of the EGR valve 54 becomes equal to or larger than the first threshold value Ovref1 and then becomes equal to or smaller than the second threshold value Ovref2 is satisfied, the electronic control unit 70 performs the jamming diagnosis to determine whether foreign matter got caught in the EGR valve 54. Thus, jamming of foreign matter in the EGR valve 54 can be detected immediately after the foreign matter got caught in the EGR valve 54. On the other hand, when the opening change condition is not satisfied, no jamming diagnosis is performed. Thus, the electronic control unit 70 is less likely or unlikely to erroneously detect (erroneously confirm) jamming of foreign matter in the EGR valve 54.

In the engine system installed on the automobile 10 of the embodiment, the electronic control unit 70 finishes the jamming diagnosis, when the counter C becomes equal to or larger than the third threshold value Cref during the jamming diagnosis. However, the electronic control unit 70 may finish the jamming diagnosis, once it confirms whether foreign matter got caught in the EGR valve 54, even if the counter C is less than the third threshold value Cref.

Figure 4:
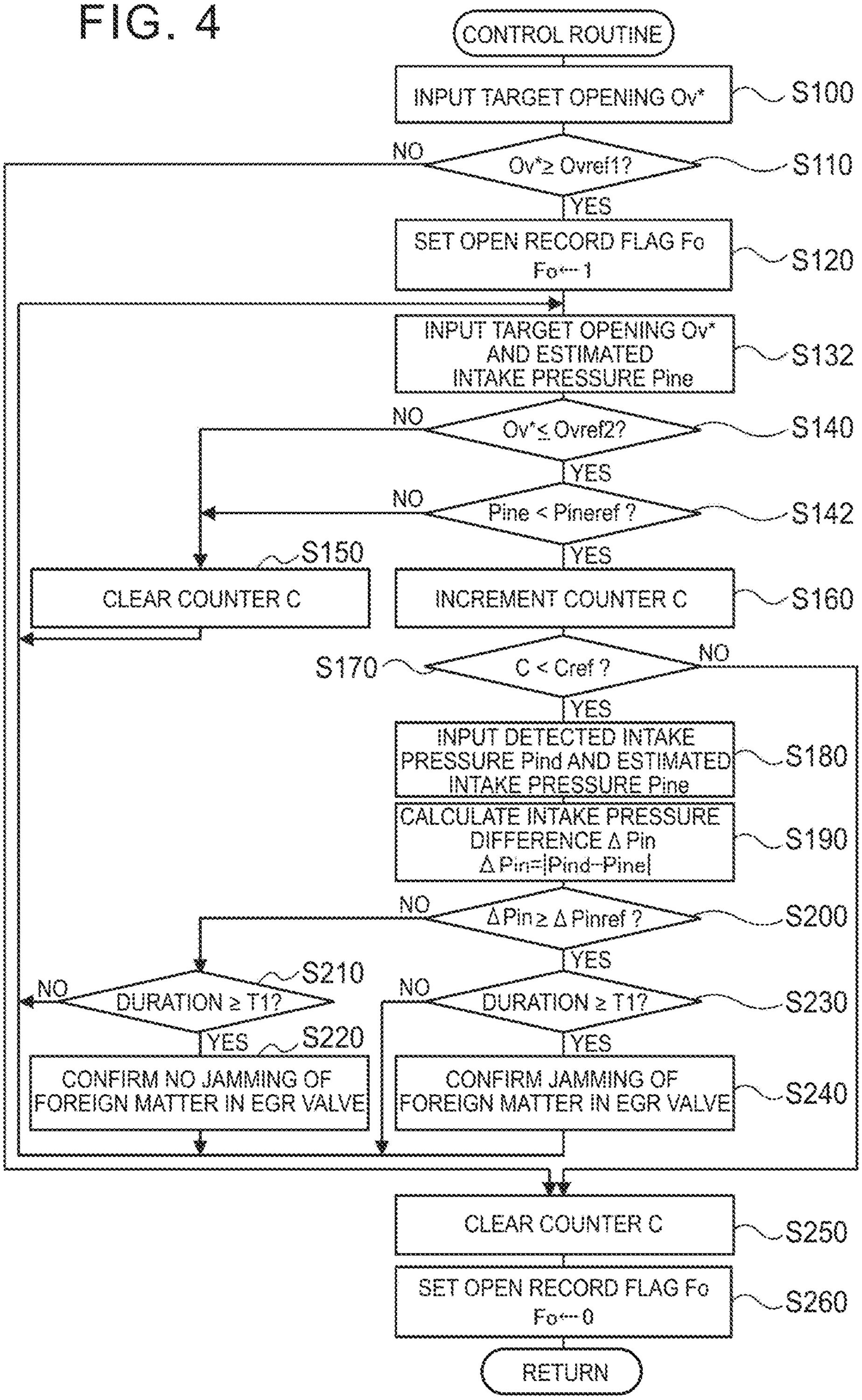
FIG. 4 is a flowchart illustrating one example of a control routine of a modified example of the embodiment of the disclosure.

In the engine system installed on the automobile 10 of the embodiment, the electronic control unit 70 executes the control routine of FIG. 2. However, the electronic control unit 70 may execute a control routine of FIG. 4, in place of that of FIG. 2. The control routine of FIG. 4 is identical with that of FIG. 2, except that step S130 is replaced with step S132, and step S142 is added. Thus, the same step numbers are assigned to the steps in the control routine of FIG. 4, which are the same as those in the control routine of FIG. 2, and detailed description of these steps will not be provided.

In the control routine of FIG. 4, after the electronic control unit 70 sets value 1 to the open record flag Fo in step S120, it inputs the estimated intake pressure Pine in addition to the target opening Ov* of the EGR valve 54 (step S132). Then, the target opening Ov* of the EGR valve 54 is compared with the second threshold value Ovref2 (step S140), and the estimated intake pressure Pine is compared with a fifth threshold value Pineref (step S142). For example, several dozens of kilopascals (kPa) is used as the threshold value Pineref. In this modified example, as a diagnosis condition of the jamming diagnosis, an intake pressure condition that the estimated intake pressure Pine is lower than the fifth threshold value Pineref is used, in addition to the opening change condition, for a reason that will be described later.

When the target opening Ov* of the EGR valve 54 is larger than the second threshold value Ovref2 in step S140, or when the estimated intake pressure Pine is equal to or higher than the fifth threshold value Pineref in step S142, the electronic control unit 70 determines that the diagnosis condition is not satisfied, and executes step S150 and subsequent steps.

When the target opening Ov* of the EGR valve 54 is equal to or smaller than the second threshold value Ovref2 in step S140, and the estimated intake pressure Pine is lower than the fifth threshold value Pineref in step S142, the electronic control unit 70 determines that the diagnosis conditions are satisfied, and executes step S160 and subsequent steps.

Figure 5:
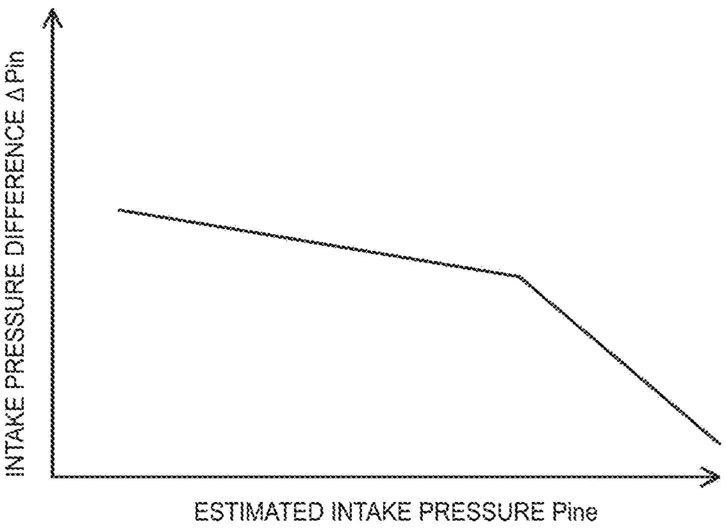
FIG. 5 is an explanatory view showing one example of the relationship between an estimated intake pressure and an intake pressure difference when an engine shown in FIG. 1 rotates at a given rotational speed, and foreign matter gets caught in the EGR valve.

In this connection, the reason why the intake pressure condition is used as the diagnosis condition, in addition to the opening change condition, will be described. FIG. 5 is an explanatory view showing one example of the relationship between the estimated intake pressure Pine and the intake pressure difference ΔPin when the engine 12 rotates at a given rotational speed and foreign matter gets caught in the EGR valve 54. The inventors obtained this relationship in advance by experiment or analysis. It is understood from FIG. 5 that the intake pressure difference ΔPin (=|Pind−Pine|) is reduced as the estimated intake pressure Pine is larger. This is because, when the estimated intake pressure Pine is large (or small as a negative pressure), the unintended EGR amount is less likely or unlikely to be large, and the intake pressure difference ΔPin is less likely or unlikely to be large, even when foreign matter gets caught in the EGR valve 54, and the valve 54 cannot be closed, against a request for closing the EGR valve 54. When a difference in the intake pressure difference ΔPin between when no foreign matter is stuck in the EGR valve 54 and when foreign matter is stuck in the EGR valve 54 is small, the electronic control unit 70 is likely to erroneously detect (or erroneously confirm) jamming of the foreign matter in the EGR valve 54. In this modified example, the intake pressure condition is used as the diagnosis condition, in addition to the opening change condition, in view of the above finding. Thus, the electronic control unit 70 can be made less likely or unlikely to erroneously detect (or erroneously confirm) jamming of foreign matter in the EGR valve 54.

In this modified example, the opening change condition, and the intake pressure condition that the estimated intake pressure Pine is lower than the fifth threshold value Pineref are used as the diagnosis conditions of the jamming diagnosis. However, in the intake pressure condition, the detected intake pressure Pind may be used, in place of the estimated intake pressure Pine.

In the illustrated embodiment, the engine system is installed on the automobile 10 that travels using power from the engine 12. However, the engine system may be installed on a hybrid vehicle including a motor for traveling, in addition to the engine. Also, the engine system may be installed on stationary equipment, such as construction equipment.

The correspondence relationship between the main elements of the embodiment and the main elements of the disclosure described in the "SUMMARY" section will be described. In the embodiment, the engine 12 is one example of the "engine" of the disclosure, the EGR device 50 is one example of the "exhaust gas recirculation device" of the disclosure, the EGR pipe 52 is one example of the "communicating pipe" of the disclosure, and the electronic control unit 70 is one example of the "electronic control unit" of the disclosure. Also, the first threshold value Ovref1 is one example of the "first predetermined opening" of the disclosure, the second threshold value Ovref2 is one example of the "second predetermined opening" of the disclosure, and the fourth threshold value ΔPinref is one example of the "threshold value" of the disclosure.

The corresponding relationship between the main elements of the embodiment and the main elements of the disclosure described in the "SUMMARY" section is not intended to limit the elements of the disclosure described in the "SUMMARY" section, since the embodiment is one example for specifically describing one mode for carrying out the disclosure described in the "SUMMARY" section. Namely, the disclosure described in the "SUMMARY" section should be interpreted based on description in this section, and the embodiment is merely one specific example of the disclosure described in the "SUMMARY" section.

While the embodiment of the disclosure has been described above, the disclosure is not limited to the embodiment, but may be embodied in various forms, without departing from the principle of the disclosure.

This disclosure can be utilized in a manufacturing industry of engine systems, for example.

What is claimed is:

1. An engine system, comprising:
- an engine including a pressure sensor configured to detect a pressure in an intake pipe as a detected intake pressure;
- an exhaust gas recirculation device including a communicating pipe that communicates an exhaust pipe of the engine with the intake pipe, and a valve provided in the communicating pipe; and
- an electronic control unit configured to control the engine, and control the valve based on a target opening of the valve, wherein
- the electronic control unit is configured to estimate the pressure in the intake pipe as an estimated intake pressure, based on an intake air amount,
- the electronic control unit is configured to perform a jamming diagnosis to determine whether foreign matter is stuck in the valve, by
  - determining whether a diagnosis condition including an opening change condition is satisfied, the opening change condition being that the target opening becomes equal to or larger than a first predetermined opening and then becomes equal to or smaller than a second predetermined opening that is smaller than the first predetermined opening, and
  - in response to determining that the diagnosis condition is satisfied, comparing an intake pressure difference between the detected intake pressure and the estimated intake pressure with a threshold value, wherein the threshold value is reduced as the estimated intake pressure is larger.

2. The engine system according to claim 1, wherein the electronic control unit is configured to set the first predetermined opening, as an opening that is larger than an opening corresponding to a minimum diameter of foreign matter that is desired to be detected when the foreign matter gets caught in the valve.

3. The engine system according to claim 1, wherein the electronic control unit is configured to perform the jamming diagnosis over a predetermined period of time, when the diagnosis condition is satisfied.

4. The engine system according to claim 1, wherein the diagnosis condition includes an intake pressure condition that the estimated intake pressure or the detected intake pressure is lower than a predetermined pressure, in addition to the opening change condition.

5. The engine system according to claim 1, wherein the electronic control unit is configured to, in response to the intake pressure difference between the detected intake pressure and the estimated intake pressure being equal to or larger than the threshold value, determine that the foreign matter is stuck in the valve.

6. The engine system according to claim 1, wherein the threshold value is a variable determined based on an amount of exhaust gas flowing through the communicating pipe of the exhaust gas recirculation device.

7. A method of controlling an engine system, the engine system including
- an engine including a pressure sensor configured to detect a pressure in an intake pipe as a detected intake pressure, and
- an exhaust gas recirculation device including a communicating pipe that communicates an exhaust pipe of the engine with the intake pipe, and a valve provided in the communicating pipe, the method comprising:
  - controlling the engine, and controlling the valve based on a target opening of the valve;
  - estimating the pressure in the intake pipe as an estimated intake pressure, based on an intake air amount; and
  - performing a jamming diagnosis to determine whether foreign matter is stuck in the valve, by
    - determining whether a diagnosis condition including an opening change condition is satisfied, the opening change condition being that the target opening becomes equal to or larger than a first predetermined opening and then becomes equal to or smaller than a second predetermined opening that is smaller than the first predetermined opening, and
    - in response to determining that the diagnosis condition is satisfied, comparing an intake pressure difference between the detected intake pressure and the estimated intake pressure with a threshold value, wherein the threshold value is reduced as the estimated intake pressure is larger.

* * * * *